US011990011B2

(12) United States Patent
Kamiguchi

(10) Patent No.: US 11,990,011 B2
(45) Date of Patent: May 21, 2024

(54) CAMERA COVER, IMAGE CAPTURING DEVICE, AND METHOD OF MANUFACTURING CAMERA COVER

(71) Applicant: CANON KABUSHIKI KAISHA, Tokyo (JP)

(72) Inventor: Kinya Kamiguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 17/859,116

(22) Filed: Jul. 7, 2022

(65) Prior Publication Data

US 2023/0012545 A1  Jan. 19, 2023

(30) Foreign Application Priority Data

Jul. 12, 2021 (JP) ................. 2021-115149

(51) Int. Cl.
*G08B 13/196* (2006.01)
*C08G 64/00* (2006.01)
*C09D 175/16* (2006.01)
*G03B 17/02* (2021.01)
*H04N 23/51* (2023.01)

(52) U.S. Cl.
CPC ..... *G08B 13/19619* (2013.01); *C09D 175/16* (2013.01); *G03B 17/02* (2013.01); *H04N 23/51* (2023.01); *C08G 64/00* (2013.01); *C08G 2261/62* (2013.01)

(58) Field of Classification Search
CPC ....... H04N 23/51; C09D 175/16; G03B 17/02
See application file for complete search history.

(56) References Cited

U.S. PATENT DOCUMENTS

| 2020/0190355 | A1 | 6/2020 | Wunderlich |
| 2021/0050553 | A1 | 2/2021 | Ogawa |
| 2023/0359074 | A1* | 11/2023 | Amin ............... G02B 1/115 |

FOREIGN PATENT DOCUMENTS

| CN | 102083896 A | 6/2011 |
| CN | 102712783 A | 10/2012 |
| CN | 106807605 A | 6/2017 |
| CN | 109396651 A | 3/2019 |
| JP | 09-255917 A | 9/1997 |
| JP | 2009-062423 A | 3/2009 |
| JP | 2011-011424 A | 1/2011 |

OTHER PUBLICATIONS

The above patent documents were cited in a European Search Report dated Nov. 16, 2022 a copy of which is enclosed, that issued in the corresponding European Patent Application No. 22181192.0. The above patent documents were cited in the Dec. 27, 2023 Chinese Office Action, a copy of which is enclosed without an English Translation, that issued in Chinese Patent Application No. 202210816738.X.

* cited by examiner

*Primary Examiner* — Minh Q Phan
(74) *Attorney, Agent, or Firm* — Cowan, Liebowitz & Latman, P.C.

(57) ABSTRACT

A camera cover is provided. The camera cover has a coating formed on a surface of the camera cover. The coating contains a urethane acrylate resin. The camera cover has a dome shape and is designed to protect an image capturing unit. A Berkovich hardness at an indenter penetration depth of 100 to 300 nm on a surface of the coating is at least 0.4 GPa.

11 Claims, 7 Drawing Sheets

CAMERA COVER, IMAGE CAPTURING DEVICE, AND METHOD OF MANUFACTURING CAMERA COVER

BACKGROUND OF THE INVENTION

Field of the Invention

The present invention relates to a camera cover and an image capturing device, as well as a method of manufacturing a camera cover, and particularly relates to a camera cover for a surveillance camera installed outdoors.

Description of the Related Art

Surveillance cameras are widely used as security systems in residential or commercial buildings or outdoors. A surveillance camera includes a transparent camera cover for protection from rainwater, pebbles, and the like. The camera cover may be scratched by flying sand or during maintenance when soiled with dirt or the like, and scratches on the camera cover may reduce the quality of captured images.

Accordingly, a technique is known in which a camera cover is made scratch-resistant by applying a coating to the camera cover. For example, Japanese Patent Laid-Open No. 9-255917 discloses a hard coating with silicone resin. Additionally, Japanese Patent Laid-Open No. 2009-62423 discloses a hard coating with urethane acrylate resin.

SUMMARY OF THE INVENTION

According to an embodiment of the present invention, a camera cover comprises: a coating formed on a surface of the camera cover, the coating containing a urethane acrylate resin, wherein the camera cover has a dome shape and is designed to protect an image capturing unit, and a Berkovich hardness at an indenter penetration depth of 100 to 300 nm on a surface of the coating is at least 0.4 GPa.

According to another embodiment of the present invention, an image capturing device comprises: an image capturing unit; and a camera cover comprising a coating formed on a surface of the camera cover, the coating containing a urethane acrylate resin, wherein the camera cover has a dome shape and is designed to protect an image capturing unit, a Berkovich hardness at an indenter penetration depth of 100 to 300 nm on a surface of the coating is at least 0.4 GPa, and the camera cover contains the image capturing unit.

According to still another embodiment of the present invention, a method of manufacturing a camera cover comprises: preparing a urethane acrylate resin coating liquid; forming a coating layer by applying the coating liquid to a camera cover substrate having a dome shape; and curing the coating layer, wherein a Berkovich hardness at an indenter penetration depth of 100 to 300 nm on a surface of the coating layer after the curing is at least 0.4 GPa.

Further features of the present invention will become apparent from the following description of exemplary embodiments (with reference to the attached drawings).

DESCRIPTION OF THE EMBODIMENTS

Figure 1:
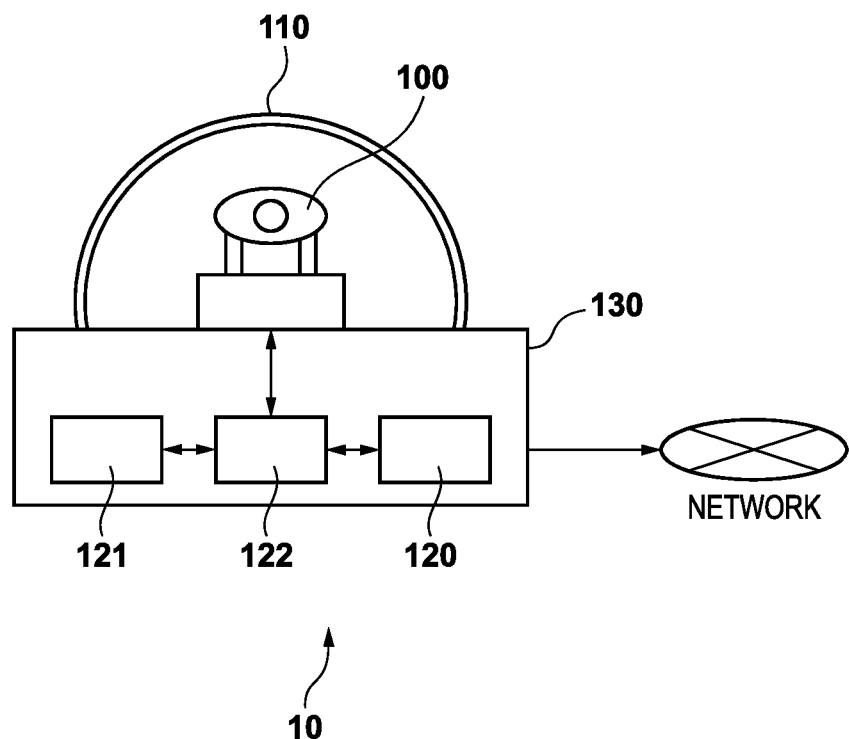
FIG. 1 is a schematic diagram of an image capturing device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The hard coating with the silicone resin described in Japanese Patent Laid-Open No. 9-255917 has problems in that cracks may occur after film deposition and that the cost is high due to the long baking time required. The hard coating with the urethane acrylate resin described in Japanese Patent Laid-Open No. 2009-62423 has the advantages of being resistant to cracking and easily curable in short periods of baking and light irradiation, but has a problem in that there is insufficient abrasion resistance.

According to one embodiment of the present invention, it is possible to obtain a camera cover that is easy to manufacture but has high abrasion resistance and is suitable for long-term outdoor installation.

FIG. 1 is a diagram illustrating an overview of an image capturing device 10 according to one embodiment of the present invention. The image capturing device 10 illustrated in FIG. 1 includes a camera unit 100, a data transfer unit 120, a data storage unit 121, and a controller 122. Images captured by the camera unit 100 can be transferred to a network via the controller 122 and the data transfer unit 120. Images captured by the camera unit 100 can be stored in the data storage unit 121 by transferring the images to the data storage unit 121 via the controller 122. The data transfer unit 120, the data storage unit 121, and the controller 122 are covered by an outer housing 130 for protection from external impacts and to prevent moisture from entering.

In one embodiment of the present invention, the camera unit 100 is covered by a camera cover 110. The camera cover 110 according to the present embodiment is a dome-shaped camera cover that protects an image capturing unit, and has a coating 1500 including urethane acrylate resin formed on a surface. This camera cover 110 can protect the camera unit 100 from external impacts and prevent moisture from entering. The specific shape of the camera cover 110 is not particularly limited. For example, the camera cover 110 can have an outer wall part and an opening, and the outer wall part can define an interior space that communicates with the opening. In this case, as illustrated in FIG. 1, the camera unit 100 can be protected by housing the camera unit 100 within the interior space of the camera cover 110 and closing off the opening using a member such as the outer housing 130. In one embodiment, the camera cover 110 has a roughly hemispherical shape.

Figure 2:
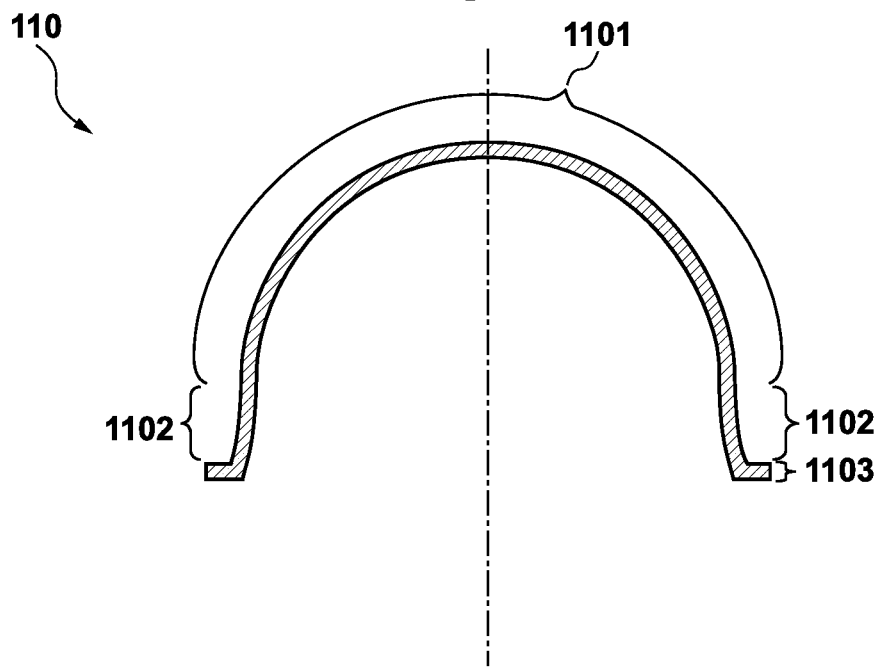
FIG. 2 is a descriptive diagram of a camera cover according to an embodiment.

FIG. 2 is a cross-sectional view illustrating an example of the camera cover 110. The camera cover 110 has a substantially hemispherical part 1101 in a central area. A skirt part 1102 is present near the edge of the substantially hemispherical part 1101, and furthermore, a flange 1103 is provided at the end. The camera cover 110 can be attached to the outer housing 130 by screwing and fixing the flange 1103 to the outer housing 130 via an O-ring. In the example in FIG. 2, the coating 1500 can be applied over the entirety of a dome 140, including the spherical outer surface of the substantially hemispherical part 1101.

The camera cover 110 has the dome 140, which is a dome-shaped camera cover substrate, and the coating 1500, which is formed on the surface thereof. To ensure that the camera unit 100 can capture images, the dome 140 is formed of a transparent resin material. The type of the dome 140 is not particularly limited, and the dome 140 may be made of polycarbonate resin, acrylic resin, or polyester resin. In one embodiment, the dome 140 is made of polycarbonate resin, which is resistant to impacts. For example, the material constituting the dome 140 may contain polycarbonate, and at least 50% or 90% (by weight) of the material constituting the dome 140 may be polycarbonate. The dome 140 may consist substantially of polycarbonate.

Figure 3:
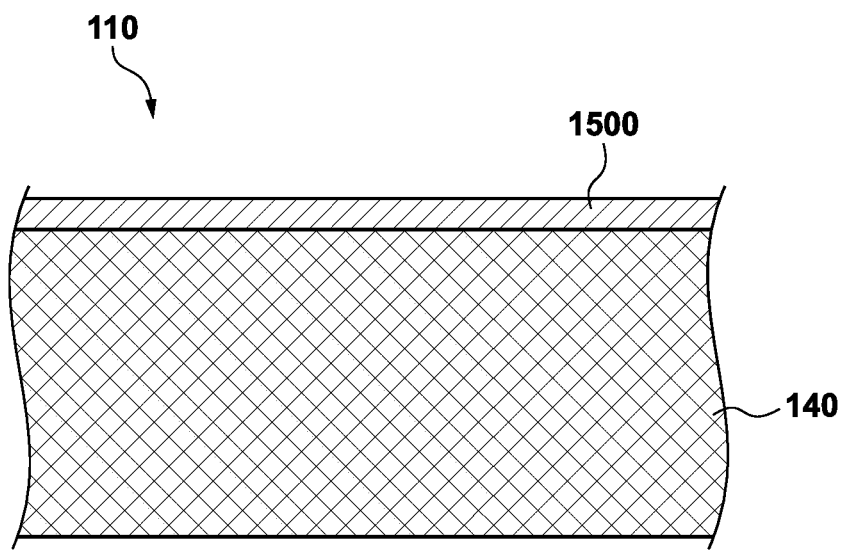
FIG. 3 is a partial cross-sectional view of a camera cover according to an embodiment.

FIG. 3 is a partial cross-sectional view of the camera cover 110 according to one embodiment. As illustrated in FIG. 3, the coating 1500 is formed on the surface of the camera cover 110. In the present embodiment, the coating 1500 is a coating containing a urethane acrylate resin. The coating containing urethane acrylate resin used in one embodiment is hard and is resistant to scratching, and can therefore be called a "hard coating". Because urethane acrylate resins can be photocured (UV-cured), the coating 1500 can be formed at low cost. Using urethane acrylate resin, which has a short drying time when applied, makes it possible to formed the coating 1500 at an even lower cost.

"Urethane acrylate resin" refers to a resin having urethane bonds and acrylic groups (including methacrylic groups), or a resin that is photocured from such a resin. A urethane acrylate resin is obtained, for example, by reacting a compound having an acrylic group (including methacrylic group) and hydroxyl group, a polyisocyanate compound (including polyisocyanurate), and, if necessary, a polyol.

The type of urethane acrylate resin is not particularly limited, but in one embodiment, an aliphatic urethane acrylate resin is used. "Aliphatic urethane acrylate resin" refers to a urethane acrylate resin obtained by using an aliphatic diisocyanate as an isocyanate unit. An aliphatic urethane acrylate resin is less likely to yellow in weather resistance tests, which makes it possible to improve the weather resistance of the camera cover. In one embodiment, a urethane acrylate resin that does not contain a benzene ring as a constitutional unit is used to improve the weather resistance of the camera cover.

One example of a urethane acrylate resin is a urethane acrylate oligomer obtained by reacting (meth)acrylate with polyisocyanate, or a resin obtained by curing this oligomer, as described in Japanese Patent Laid-Open No. 2009-62423.

The urethane acrylate resin may also contain a photo-radical polymerization initiator to promote the photocuring of the urethane acrylate resin. The type of photo-radical polymerization initiator is not particularly limited, and an α-hydroxyalkylphenone such as 1-hydroxycyclohexylphenyl ketone, benzophenones, or the like can be given as an example.

In the present embodiment, the Berkovich hardness of the coating 1500 at an indenter penetration depth of 100 to 300 [nm] is at least 0.4 [GPa]. In the present specification, the Berkovich hardness can be measured through nanoindentation using a Berkovich diamond indenter according to ISO 14577-1:2015 and ISO 14577-4:2016. Because the thickness of the coating 1500 is often 2 [μm] to 10 [μm], the indenter penetration depth is set to 100 to 300 [nm], which corresponds to about 1/10 of the thickness, in order to obtain physical property values irrelevant to the characteristics of the substrate. As will be described below, the inventors of the present application found that by adjusting the Berkovich hardness to at least 0.4 [GPa], it is possible to impart the coating 1500 with abrasion resistance sufficient for practical use as an optical component. Good abrasion resistance can be obtained by adjusting the Berkovich hardness to at least 0.45 [GPa], and extremely good abrasion resistance can be obtained by adjusting the Berkovich hardness to at least 0.55 [GPa].

Additionally, in one embodiment, the surface of the coating 1500 has a haze value change of no greater than 10% when the abrasion resistance is evaluated through the following method. In the abrasion resistance evaluation in the present specification, a sample cut from the camera cover 110 is rubbed with steel wool (steel wool roughness of #0000, 2000 g load, five times back and forth), and the difference in the haze value of the rubbed area before and after the rubbing can be measured. In the present specification, the haze value can be measured according to JIS K7136:2000. The coating 1500 has extremely good abrasion resistance when the change in haze value is no greater than 5%; good abrasion resistance, when the change is greater than 5% but no greater than 7%; and sufficient abrasion resistance for practical use when the change is greater than 7% but no greater than 10%.

In one embodiment, the thickness of the coating 1500 can be at least 2 [μm] to ensure that the functions of the coating 1500 can be fully achieved. Additionally, in one embodiment, the thickness of the coating 1500 can be no greater than 10 [μm] to suppress optical effects.

In the present specification, the Berkovich hardness measurement and abrasion resistance evaluation can be performed for a top part and a peripheral part of the camera cover 110, respectively. For example, the measurements and evaluations can be performed at the central part of the substantially hemispherical part 1101 and the skirt part 1102. If the Berkovich hardness is at least a predetermined value at both the top part and the peripheral part of the camera cover 110, the Berkovich hardness of the camera cover 110 can be determined to be at least the predetermined value. Similarly, if the change in the haze value is no greater than a predetermined value at both the top part and the peripheral part of the camera cover 110, the change in the haze value of the camera cover 110 can be determined to be no greater than a predetermined value. The hardness and abrasion resistance of the peripheral part of the camera cover 110 can be measured and evaluated at one point on the outer surface of the camera cover 110 at an edge of an imaging capturing range of the camera unit 100, or at a plurality of points along the edge. The same applies to the measurement of the thickness.

As will be described below, the hardness of the coating 1500 depends on the intensity of the light used during curing, and thus the Berkovich hardness measurement and abrasion resistance evaluation may be performed on the area where the incident light is weakest. In this case, if the Berkovich hardness is at least the predetermined value and the change in the haze value is no greater than the predetermined value at this area where the emitted light is weakest, it can be determined that the Berkovich hardness of the camera cover 110 is at least a predetermined value and the change in the haze value is no greater than a predetermined value.

In one embodiment, the Berkovich hardness is at least 0.4 [GPa], at least 0.45 [GPa], or at least 0.55 [GPa] in the entire part of the outer surface of the camera cover 110 that is within the imaging capturing range of the camera unit 100. Additionally, in one embodiment, the Berkovich hardness is at least 0.4 [GPa], at least 0.45 [GPa], or at least 0.55 [GPa] in the entire outer surface of the camera cover 110.

Figure 8:
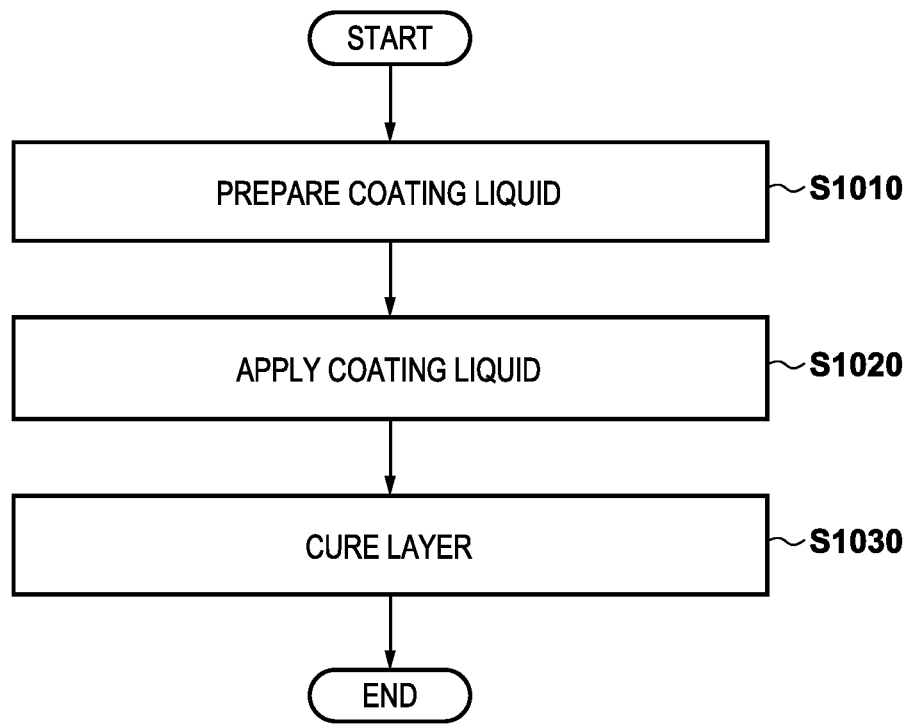
FIG. 8 is a flowchart illustrating a method of manufacturing a camera cover according to one embodiment.

Next, a method of manufacturing the camera cover 110 by applying the coating 1500 will be described with reference to FIG. 8. In step S1010, a urethane acrylate resin coating liquid is prepared. A coating liquid containing urethane acrylate oligomers can be used as the coating liquid for the coating. Here, the viscosity of the coating liquid may be adjusted to vary the thickness of the coating 1500 based on the relationship between surface tension and viscosity. By adjusting the viscosity of the coating liquid, a thickness sufficient for the coating 1500 to function as the coating 1500 can be ensured while suppressing optical effects caused by the coating 1500 being too thick.

In step S1020, a coating layer is formed by applying the coating liquid prepared in step S1010 to the dome 140. Although the coating device and method of applying the coating liquid are not particularly limited, in the present embodiment, spin coating using a spin coater is used to ensure more uniform application to the dome 140, which has a three-dimensional shape. However, other methods such as dip coating, spray coating, or the like may be used.

In step S1030, the coating layer applied in step S1020 is cured. Because urethane acrylate resins are photocuring resins, the coating layer can be cured through light irradiation. In the present embodiment, the coating 1500 can be fixed by evaporating an organic carrier from the coating layer through heating and drying, and then performing irradiation with ultraviolet light. The heating method is not particularly limited, and a hot-blast furnace, an electric furnace, a far-infrared furnace, a near-infrared furnace, or the like can be used to hold a heating target at a specified temperature.

Additionally, the light source is not particularly limited, and an ultraviolet lamp such as a mercury lamp can be used, for example. Incidentally, as described in the working examples below, the inventors of the present application found that the hardness of the coating 1500 depends on the light irradiation intensity. In one embodiment, light irradiation is performed to achieve an accumulated light intensity of at least 2000 [mJ/mm$^2$] to obtain an abrasion resistance in the coating 1500 that is sufficient for practical use. To achieve good abrasion resistance, light irradiation can be performed such that the accumulated light intensity is at least 2400 [mJ/mm$^2$], and to achieve extremely good abrasion resistance, light irradiation can be performed such that the accumulated light intensity is at least 3000 [mJ/mm$^2$].

Furthermore, in one embodiment, light irradiation is performed to achieve an illuminance of at least 140 [mW/mm$^2$] to obtain an abrasion resistance in the coating 1500 that is sufficient for practical use. To achieve good abrasion resistance, light irradiation can be performed such that the illuminance is at least 170 [mW/mm$^2$], and to achieve extremely good abrasion resistance, light irradiation can be performed such that the illuminance is at least 220 [mW/mm$^2$].

Similar to the Berkovich hardness measurement, light irradiation may be performed such that the accumulated light intensity or the illuminance at each of the top part and the peripheral part of the camera cover 110 is at least a predetermined value. Light irradiation may be performed such that the accumulated light intensity or the illuminance at the weakest part of the incident light is at least the predetermined value. Furthermore, light irradiation may be performed such that the accumulated light intensity or the illuminance is at least the predetermined value for the entire part of the outer surface of the camera cover 110 that is within the imaging capturing range of the camera unit 100. Additionally, light irradiation may be performed such that the accumulated light intensity or the illuminance is at least the predetermined value for the entire outer surface of the camera cover 110.

The light irradiation method is not particularly limited. However, by irradiating light from a plurality of positions, it is possible to irradiate the camera cover 110, which has a complex three-dimensional shape, more uniformly, which in turn makes it easier to provide sufficient abrasion resistance over the entire camera cover 110. From this perspective, the camera cover 110 can be irradiated with light from at least two or at least three positions. For example, a plurality of light sources may be provided and the camera cover 110 may be irradiated with light from each of the light sources. The camera cover 110 may also be irradiated with light from a mobile light source. In this case, by fixing the light source to a movable member such as a robot arm and controlling the position of the movable member, a single light source can be used to irradiate the camera cover 110 from a plurality of positions.

EXAMPLES

First Working Example

The coating liquid was produced by mixing coating liquid stock solution Z-700W-7 (manufactured by AICA Kogyo Co., Ltd.) with an organic solvent. The coating liquid stock solution Z-700W-7 contains urethane acrylate obtained from aliphatic diisocyanate. As an organic solvent, 1-methoxy-2-propanol (manufactured by Kishida Chemical Co., Ltd.), which is one of the components of the coating liquid stock solution Z-700W-7, was used to adjust the viscosity.

The resulting coating liquid was then applied to the dome using a spin coater, dried, and UV-cured to produce the camera cover. MS-B300 (manufactured by Mikasa Co., Ltd.) was used as the spin coater. The method illustrated in FIG. 4 was used to apply 10 [mL] of the coating liquid from the top of the dome using a nozzle, and the spin coater was run at a rotational speed of 200 [rpm] and a rotation time of 30 [sec] to spread the coating liquid to the skirt part of the dome and coat the dome with the coating liquid evenly. Drying was performed by heating for 5 [min] in a circulating hot-blast furnace at 86° C.±5° C.

Figure 4:
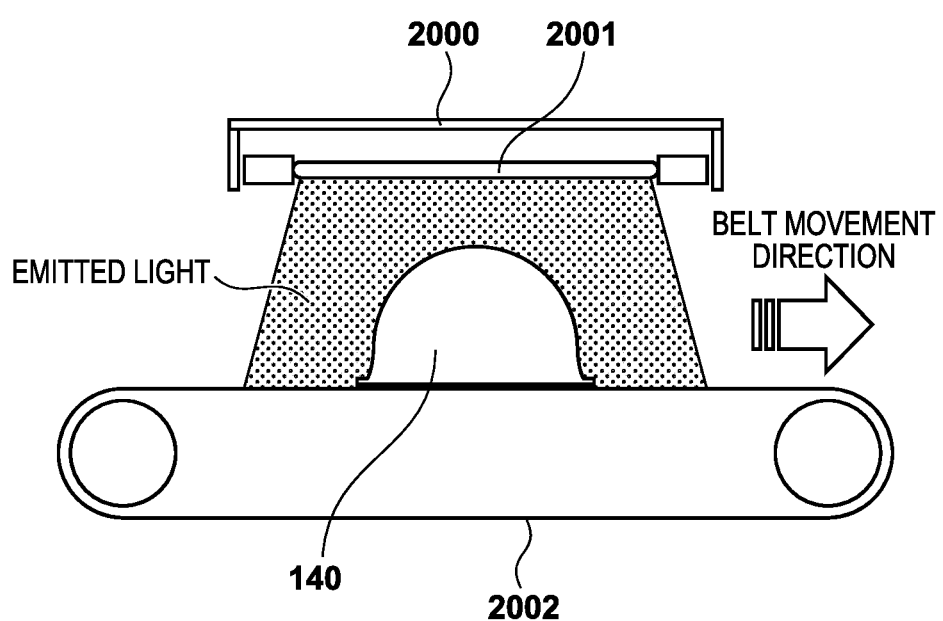
FIG. 4 is a diagram illustrating a light irradiation method for photocuring.

The UV-curing method is illustrated in FIG. 4. In the present working example, a high-pressure mercury lamp unit 2000 was installed above a conveyor belt 2002. Then, the dried dome 140 was placed on the conveyor belt 2002 and passed under the high-pressure mercury lamp while the dome 140 is irradiated with the light from a single high-pressure mercury lamp 2001 from above. Here, an air-cooled mercury lamp H08-L41 (manufactured by Iwasaki Electric Co., Ltd.) was used as the mercury lamp. To measure the illuminance of the ultraviolet light, ultraviolet light at a wavelength of 254 [nm] was measured using an accumulated UV meter UIT-250 (manufactured by Ushio Inc.). The illuminance of the ultraviolet light was measured by fixing the sensor part of the accumulated UV meter toward the light from the high-pressure mercury lamp and moving the sensor part on the conveyor belt. In this configuration, the incident light on the skirt part of the dome 140 on the left and right sides with respect to the belt movement direction was the weakest. Therefore, the illuminance and irradiation time of the mercury lamp were adjusted so that the illuminance in this area was 100 [mW/mm$^2$] and the accumulated light intensity was 800 [mJ/mm$^2$]. Note that the illuminance of 100 [mW/mm$^2$] and the accumulated light intensity of 800 [mJ/mm$^2$] are the curing conditions recommended by the coating liquid manufacturer. Because the coating liquid contains α-hydroxyalkylphenone, which is a photoinitiator, the UV irradiation resulted in polymerization, which in turn lead to curing of the coating liquid and fixation. Here, the curing of the coating liquid was accelerated by a photo-radical polymerization reaction.

The abrasion resistance of the resulting coating was then evaluated. In the present working example (and the following working examples), the abrasion resistance of the area where the incident light was weakest (in the present working example, the skirt part on the left and right relative to the belt movement direction) was evaluated. Specifically, a sample cut from the camera cover was rubbed with steel wool (steel wool roughness of #0000, 2000 g load, five times back and forth), and the change in the haze value of the rubbed area before and after the rubbing was measured. The haze value was measured using a haze meter HM-150L2N (manufactured by Murakami Color Research Laboratory Co., Ltd.). The obtained change in the haze was 30%, which was evaluated as insufficient abrasion resistance as a coating layer for optical components.

The Berkovich hardness of the resulting coating was also measured. In the present working example (and the following working examples), the Berkovich hardness of the area where the incident light was weakest (in the present working example, the skirt part on the left and right relative to the belt movement direction) was measured. The Berkovich hardness was measured through nanoindentation using a Nano Indenter G200 (manufactured by KLA Corporation). A Berkovich diamond indenter was used as the indenter. The obtained Berkovich hardness was 0.25 [GPa].

Second Working Example

Figure 5:
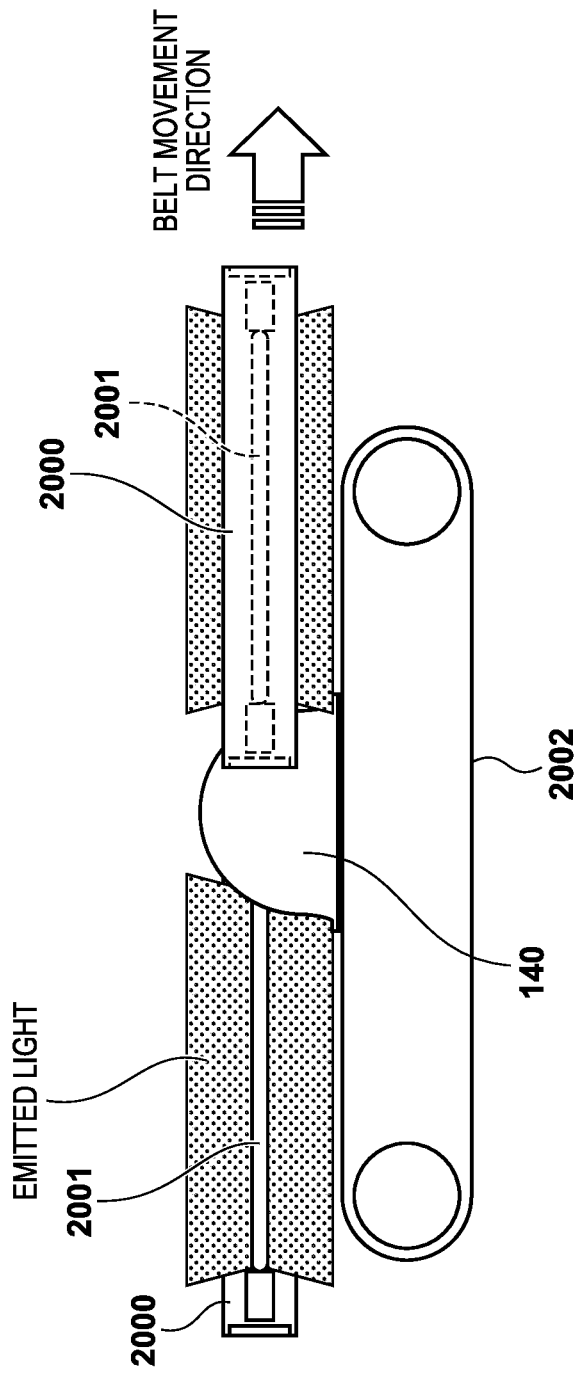
FIG. 5 is a diagram illustrating a light irradiation method for photocuring.

A camera cover was manufactured in a similar manner as in the first working example, aside from the UV irradiation method, and was evaluated for abrasion resistance and measured for Berkovich hardness. The UV-curing method used in the present working example is illustrated in FIG. 5. In the present working example, high-pressure mercury lamp units 2000 were installed at the left and right with respect to the movement direction of the conveyor belt 2002. Then, the dried dome 140 was placed on the conveyor belt 2002 and passed through the installation positions of the high-pressure mercury lamps 2001 while the dome 140 is irradiated with the light from two high-pressure mercury lamps 2001 from the left and right, respectively. In this configuration, the incident light on the top part of the dome 140 was weakest, with an illuminance of 127 [mW/mm$^2$] and an accumulated light intensity of 1777 [mJ/mm$^2$] at this part. For this part of the camera cover that was obtained, the change in the haze obtained from the abrasion resistance evaluation test was 15.3%, and the Berkovich hardness was 0.36 [GPa].

Third Working Example

Figure 6:
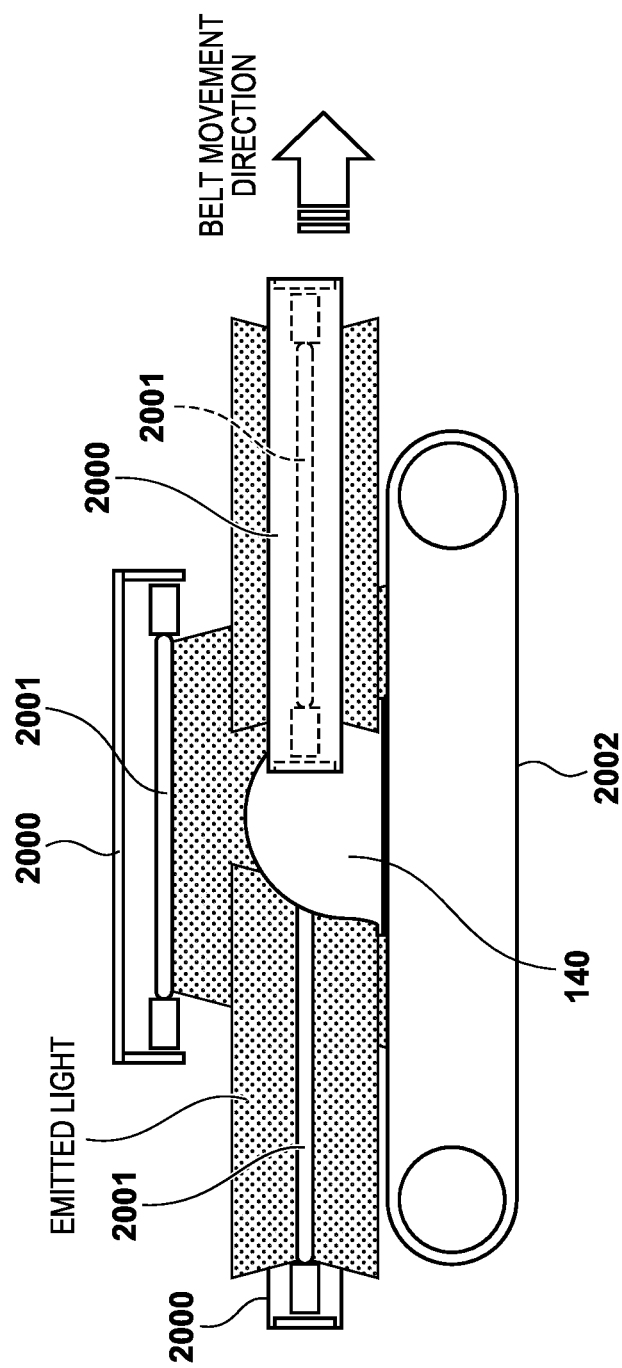
FIG. 6 is a diagram illustrating a light irradiation method for photocuring.

A camera cover was manufactured in a similar manner as in the first working example, aside from the UV irradiation method, and was evaluated for abrasion resistance and measured for Berkovich hardness. The UV-curing method used in the present working example is illustrated in FIG. 6. In the present working example, a high-pressure mercury lamp unit 2000 was installed above the conveyor belt 2002, and furthermore, high-pressure mercury lamp units 2000 were installed at the left and right with respect to the movement direction of the conveyor belt 2002. Then, the dried dome 140 was placed on the conveyor belt 2002 and passed through the installation positions of the high-pressure mercury lamps 2001 while the dome 140 is irradiated with the light from three high-pressure mercury lamps 2001 from above, the left, and the right, respectively. In this configuration, the incident light on the skirt part of the dome 140 on the left and right sides with respect to the belt movement direction was the weakest, with an illuminance of 135 [mW/mm$^2$] and an accumulated light intensity of 1886 [mJ/mm$^2$] at this part. For this part of the camera cover that was obtained, the change in the haze obtained from the abrasion resistance evaluation test was 10.8%, and the Berkovich hardness was 0.38 [GPa].

Fourth Working Example

A camera cover was manufactured in a similar manner as in the third working example, aside from the UV illuminance and accumulated intensity, and was evaluated for abrasion resistance and measured for Berkovich hardness. In this configuration, the incident light on the skirt part of the dome 140 on the left and right sides with respect to the belt movement direction was the weakest, with an illuminance of 143 [mW/mm$^2$] and an accumulated light intensity of 2001 [mJ/mm$^2$] at this part. For this part of the camera cover that was obtained, the change in the haze obtained from the abrasion resistance evaluation test was 10%, and the Berkovich hardness was 0.40 [GPa].

Fifth Working Example

Figure 7:
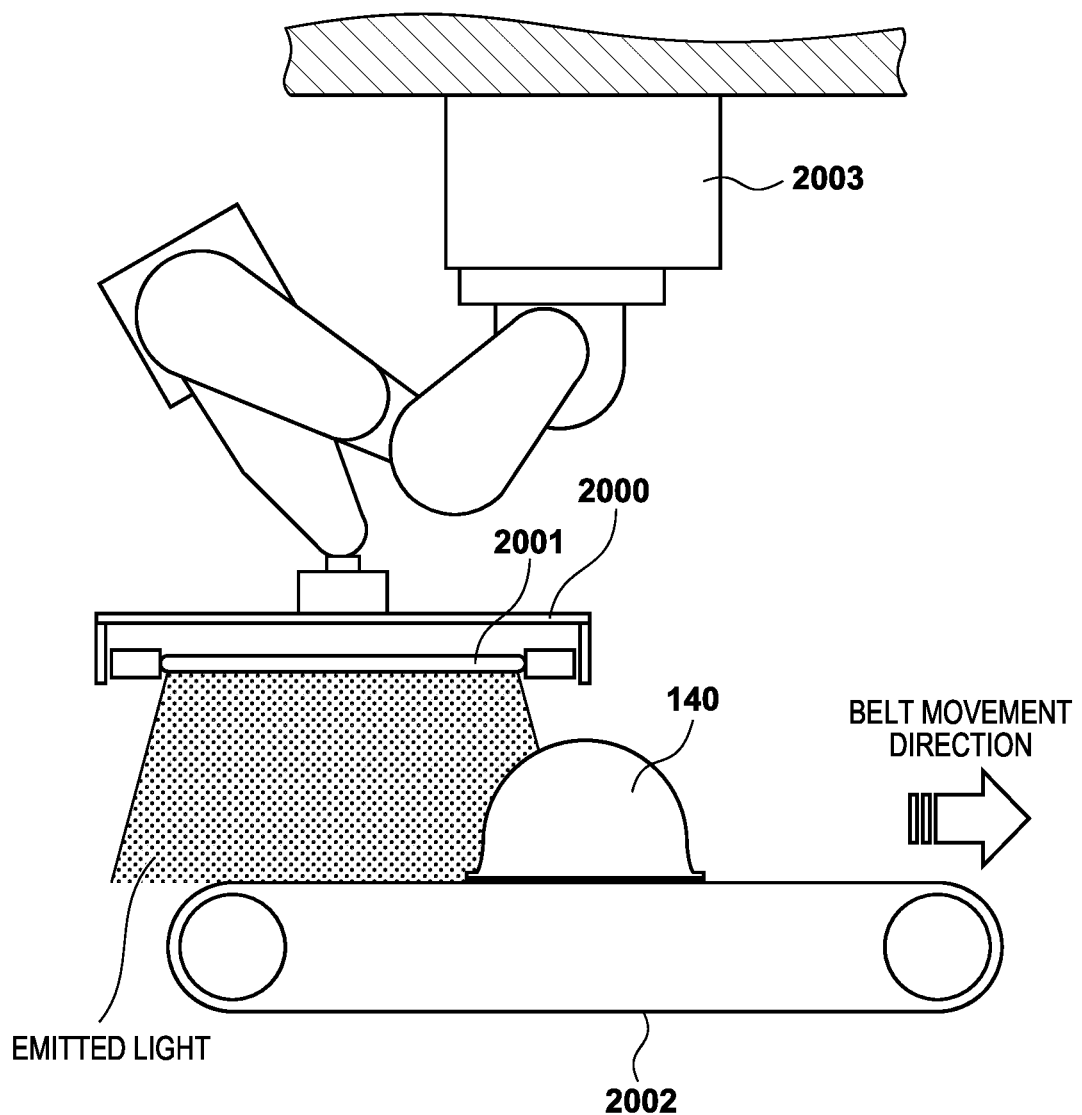
FIG. 7 is a diagram illustrating a light irradiation method for photocuring.

A camera cover was manufactured in a similar manner as in the first working example, aside from the UV irradiation method, and was evaluated for abrasion resistance and measured for Berkovich hardness. The UV-curing method used in the present working example is illustrated in FIG. 7. In the present working example, the high-pressure mercury lamp unit 2000 was installed above the conveyor belt 2002 via a six-axis articulated robot 2003. Then, while moving the position of the high-pressure mercury lamp unit 2000, the dried dome 140 was placed on the conveyor belt 2002 and passed through the installation position of the high-pressure mercury lamp 2001. In this case, the six-axis articulated robot 2003 was driven so that the dome 140 is irradiated with light from a single high-pressure mercury lamp 2001 from the left and right sides with respect to the belt movement direction. In this configuration, the light was irradiated from two directions, and therefore the dome 140 could be almost uniformly irradiated with the emitted light. For the top part of the dome 140 of the camera cover that was obtained, where the incident light was weakest, the average illuminance was 156 [mW/mm$^2$], and the accumulated light intensity was 2188 [mJ/mm$^2$]. For this part, the change in the haze obtained from the abrasion resistance evaluation test was 8.9%, and the Berkovich hardness was 0.43 [GPa].

Sixth Working Example

A camera cover was manufactured in a similar manner as in the fifth working example, aside from the UV irradiation method, and was evaluated for abrasion resistance and measured for Berkovich hardness. In the present working example, the six-axis articulated robot 2003 was driven so that the dome 140 is irradiated with light from a single high-pressure mercury lamp 2001 from above, as well as from the left and right sides with respect to the belt movement direction. In this configuration, the light was irradiated from three directions, and therefore the dome 140 could be almost uniformly irradiated with the emitted light, resulting in an average illuminance of 161 [mW/mm$^2$] and an accumulated light intensity of 2254 [mJ/mm$^2$]. For the top part of the dome 140 in the camera cover that was obtained, where the incident light was the weakest, the change in the haze obtained from the abrasion resistance evaluation test was 8.3%, and the Berkovich hardness was 0.44 [GPa].

Seventh Working Example

A camera cover was manufactured in a similar manner as in the fifth working example, aside from the UV irradiation method, and was evaluated for abrasion resistance and measured for Berkovich hardness. In the present working example, the six-axis articulated robot 2003 was driven so that the dome 140 is irradiated with light from a single high-pressure mercury lamp 2001 from above, as well as from the left and right sides with respect to the belt movement direction. In this configuration, the light was irradiated from three directions, and therefore the dome 140 could be almost uniformly irradiated with the emitted light. For the top part of the dome 140 of the camera cover that was obtained, where the incident light was weakest, the average illuminance was 161 [mW/mm$^2$], and the accumulated light intensity was 2254 [mJ/mm$^2$]. For this part, the change in the haze obtained from the abrasion resistance evaluation test was 7.8%, and the Berkovich hardness was 0.44 [GPa].

Eighth Working Example

A camera cover was manufactured in a similar manner as in the sixth working example, aside from the UV illuminance and accumulated light intensity, and was evaluated for abrasion resistance and measured for Berkovich hardness. In this configuration, the dome 140 could be almost uniformly irradiated with the emitted light. For the top part of the dome 140 of the camera cover that was obtained, where the incident light was weakest, the average illuminance was 176 [mW/mm$^2$], and the accumulated light intensity was 2464 [mJ/mm$^2$]. For this part, the change in the haze obtained from the abrasion resistance evaluation test was 6.9%, and the Berkovich hardness was 0.47 [GPa].

Ninth Working Example

A camera cover was manufactured in a similar manner as in the sixth working example, aside from the UV illuminance and accumulated light intensity, and was evaluated for abrasion resistance and measured for Berkovich hardness. In this configuration, the dome 140 could be almost uniformly irradiated with the emitted light. For the top part of the dome 140 of the camera cover that was obtained, where the incident light was weakest, the average illuminance was 204 [mW/mm$^2$], and the accumulated light intensity was 2859 [mJ/mm$^2$]. For this part, the change in the haze obtained from the abrasion resistance evaluation test was 5.7%, and the Berkovich hardness was 0.5 [GPa].

Tenth Working Example

A camera cover was manufactured in a similar manner as in the sixth working example, aside from the UV illuminance and accumulated light intensity, and was evaluated for abrasion resistance and measured for Berkovich hardness. In this configuration, the dome 140 could be almost uniformly irradiated with the emitted light. For the top part of the dome 140 of the camera cover that was obtained, where the incident light was weakest, the average illuminance was 349 [mW/mm$^2$], and the accumulated light intensity was 4883 [mJ/mm$^2$]. For this part, the change in the haze obtained from the abrasion resistance evaluation test was 2.1%, and the Berkovich hardness was 0.7 [GPa].

The following table summarizes the illuminances and accumulated light intensities in the first to tenth working examples. As mentioned above, each working example has different UV irradiation conditions, i.e., light direction, as well as the light illuminance and irradiation time. The illuminance and accumulated light intensity vary for each part of the dome, but the table below shows the illuminance and accumulated light intensity for the part of the dome having the lowest accumulated light intensity.

TABLE 1

| WORKING EXAMPLE | ILLUMINANCE mW/mm$^2$ | ACCUMULATED LIGHT INTENSITY mJ/mm$^2$ |
| --- | --- | --- |
| 1 | 100 | 800 |
| 2 | 127 | 1777 |
| 3 | 135 | 1886 |
| 4 | 143 | 2001 |
| 5 | 156 | 2188 |
| 6 | 161 | 2254 |
| 7 | 161 | 2254 |
| 8 | 176 | 2464 |
| 9 | 204 | 2859 |
| 10 | 349 | 4883 |

Figure 9:
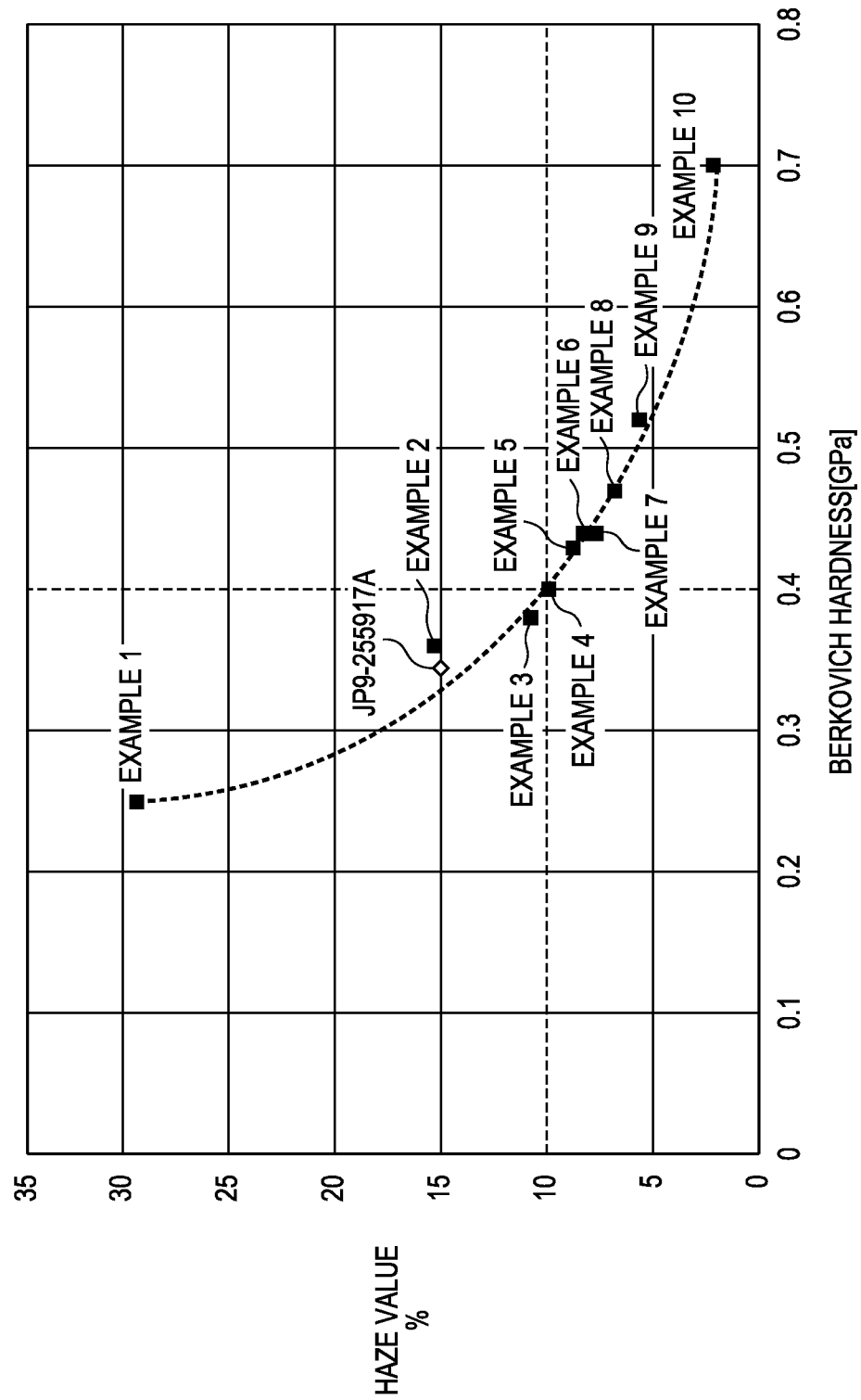
FIG. 9 is a diagram illustrating a relationship between a Berkovich hardness and a haze value.

Additionally, FIG. 9 illustrates a relationship between the change in haze value and the Berkovich hardness measured in each working example. In FIG. 9, the vertical axis represents the change in the haze value in the abrasion resistance evaluation, and the horizontal axis represents the Berkovich hardness. FIG. 9 also shows, for reference, the results of abrasion resistance evaluation and Berkovich hardness measurement conducted in a similar manner for the silicone resin disclosed in Japanese Patent Laid-Open No. 9-255917 (hereinafter referred to as JP9-255917A). For the silicone resin disclosed in JP9-255917A, the change in the haze value obtained in the abrasion resistance evaluation test was 15%, and the Berkovich hardness was 0.34 [GPa].

As illustrated in FIG. 9, there was a correlation between the change in the haze value in the abrasion resistance evaluation test and the Berkovich hardness. In other words, the higher the Berkovich hardness was, the smaller the change in the haze value was in the abrasion resistance evaluation. From these results, it can be seen that abrasion resistance can be estimated from the Berkovich hardness. In particular, it was confirmed that when the Berkovich hardness is at least 0.4 GPa, the change in the haze value in the abrasion resistance test is less than 10%, and the abrasion resistance is therefore sufficient for practical use in optical components. Additionally, it was confirmed that when the Berkovich hardness is at least 0.45 GPa, the change in the haze value in the abrasion resistance test is less than 7%, and good abrasion resistance can therefore be achieved. Furthermore, it was confirmed that when the Berkovich hardness is at least 0.55 GPa, the change in the haze value in the abrasion resistance test is less than 5%, and extremely good abrasion resistance can therefore be achieved.

Additionally, it can be seen that performing light irradiation such that the accumulated light intensity is at least 2000 [mJ/mm$^2$] results in a Berkovich hardness of at least 0.4 GPa. Furthermore, it can be seen that performing light irradiation such that the accumulated light intensity is at least 2400 [mJ/mm$^2$] and at least 3000 [mJ/mm$^2$] results in a Berkovich hardness of at least 0.45 GPa and at least 0.55 GPa, respectively.

Additionally, it can be seen that performing light irradiation such that the illuminance is at least 140 [mW/mm$^2$] results in a Berkovich hardness of at least 0.4 GPa. Furthermore, it can be seen that performing light irradiation such that the illuminance is at least 170 [mW/mm$^2$] and at least 220 [mW/mm$^2$] results in a Berkovich hardness of at least 0.45 GPa and at least 0.55 GPa, respectively.

In order to cure coatings provided on the surface of a member having a complex three-dimensional shape, such as a camera cover, it was found to be effective to irradiate UV light from a plurality of positions, and particularly from at least three positions. According to such a configuration, it is easy to perform photocuring such that the entire coating has a sufficient hardness.

Based on the above results, forming a coating containing urethane acrylate resin on the surface of a camera cover such that the Berkovich hardness is at least 0.4 [GPa] makes it possible to obtain a camera cover and an image capturing device that can achieve good abrasion resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-115149, filed Jul. 12, 2021, which is hereby incorporated by reference herein in its entirety.

What is claimed is:

1. A camera cover comprising:
   a coating formed on a surface of the camera cover, the coating containing a urethane acrylate resin,
   wherein the camera cover has a dome shape and is designed to protect an image capturing unit, and
   a Berkovich hardness at an indenter penetration depth of 100 to 300 nm on a surface of the coating is at least 0.4 GPa.

2. The camera cover according to claim 1,
   wherein a thickness of the coating is at least 2 μm and no greater than 10 μm.

3. The camera cover according to claim 1,
   wherein the urethane acrylate resin contains a photo-radical polymerization initiator.

4. The camera cover according to claim 3,
   wherein the photo-radical polymerization initiator is α-hydroxyalkylphenone.

5. The camera cover according to claim 1,
   wherein the urethane acrylate resin is an aliphatic urethane acrylate resin.

6. The camera cover according to claim 1,
   wherein the camera cover is made of a polycarbonate resin.

7. The camera cover according to claim 1,
   wherein a change in a haze value between before and after rubbing is no greater than 10%, wherein the surface of the coating is rubbed five times back and forth with steel wool having a roughness of #0000 at a load of 2000 g in the rubbing.

8. An image capturing device comprising:
   an image capturing unit; and
   a camera cover comprising a coating formed on a surface of the camera cover, the coating containing a urethane acrylate resin,
   wherein the camera cover has a dome shape and is designed to protect an image capturing unit,
   a Berkovich hardness at an indenter penetration depth of 100 to 300 nm on a surface of the coating is at least 0.4 GPa, and
   the camera cover contains the image capturing unit.

9. A method of manufacturing a camera cover, the method comprising:
   preparing a urethane acrylate resin coating liquid;
   forming a coating layer by applying the coating liquid to a camera cover substrate having a dome shape; and
   curing the coating layer,
   wherein a Berkovich hardness at an indenter penetration depth of 100 to 300 nm on a surface of the coating layer after the curing is at least 0.4 GPa.

10. The method of manufacturing the camera cover according to claim 9,
    wherein in the curing of the coating layer, the camera cover substrate is irradiated with light at an accumulated light intensity of at least 2000 mJ/mm$^2$.

11. The method of manufacturing the camera cover according to claim 9,
    wherein in the curing of the coating layer, the camera cover substrate is irradiated with ultraviolet light from a plurality of positions.

* * * * *